(12) United States Patent
Nishino et al.

(10) Patent No.: US 10,906,608 B2
(45) Date of Patent: *Feb. 2, 2021

(54) BICYCLE SYSTEM

(71) Applicant: Shimano Inc., Osaka (JP)

(72) Inventors: Takafumi Nishino, Osaka (JP);
Toshihiko Takahashi, Osaka (JP);
Daisuke Nago, Osaka (JP)

(73) Assignee: Shimano Inc., Osaka (JP)

( * ) Notice: Subject to any disclaimer, the term of this patent is extended or adjusted under 35 U.S.C. 154(b) by 247 days.

This patent is subject to a terminal disclaimer.

(21) Appl. No.: 16/161,583

(22) Filed: Oct. 16, 2018

(65) Prior Publication Data

US 2019/0118903 A1 Apr. 25, 2019

(30) Foreign Application Priority Data

Oct. 24, 2017 (JP) ................................ 2017-205537

(51) Int. Cl.

| | |
|---|---|
| *B62M 6/50* | (2010.01) |
| *B62J 99/00* | (2020.01) |
| *B62L 3/02* | (2006.01) |
| *B60T 8/00* | (2006.01) |
| *B60T 8/17* | (2006.01) |
| *B62M 6/55* | (2010.01) |
| *B60T 8/18* | (2006.01) |
| *B60T 8/32* | (2006.01) |
| *B62J 45/20* | (2020.01) |
| *B62J 45/40* | (2020.01) |

(52) U.S. Cl.
CPC ................ *B62M 6/50* (2013.01); *B60T 8/00* (2013.01); *B60T 8/1706* (2013.01); *B62J 99/00* (2013.01); *B62L 3/02* (2013.01); *B60T 8/17* (2013.01); *B60T 8/1875* (2013.01); *B60T 8/3225* (2013.01); *B62J 45/20* (2020.02); *B62J 45/40* (2020.02); *B62M 6/55* (2013.01)

(58) Field of Classification Search
CPC ... B62M 6/50; B62M 6/55; B60T 8/00; B60T 8/1706; B62L 3/02; B62J 45/20; B62J 45/40
USPC .......................................................... 701/22
See application file for complete search history.

(56) References Cited

U.S. PATENT DOCUMENTS

| | | | |
|---|---|---|---|
| 4,626,042 A | 12/1986 | Burckhardt | |
| 9,037,199 B1 * | 5/2015 | Stogaitis | ............... A61B 5/1116 455/574 |

(Continued)

FOREIGN PATENT DOCUMENTS

| | | |
|---|---|---|
| CN | 106064663 A | 11/2016 |
| DE | 10 2016 107 655 A1 | 11/2016 |

(Continued)

*Primary Examiner* — Yazan A Soofi
(74) *Attorney, Agent, or Firm* — Global IP Counselors, LLP (57) ABSTRACT

A brake system includes a driving part driven by electric power to brake a rotary body of a human-powered vehicle and an electronic controller configured to control the driving part. The electronic controller has a plurality of control modes including a first mode that drives the driving part in accordance with a user operation and a second mode that does not drive the driving part regardless of the user operation. The electronic controller is configured to switch the plurality of control modes based on setting information related to an input to the human-powered vehicle.

25 Claims, 4 Drawing Sheets

(56) References Cited

U.S. PATENT DOCUMENTS

| | | | | |
|---|---|---|---|---|
| 2008/0111342 A1* | 5/2008 | Niekerk | ............... | B60T 8/329 |
| | | | | 280/261 |
| 2014/0209400 A1* | 7/2014 | Yao | ............... | B62M 6/45 |
| | | | | 180/167 |
| 2016/0311491 A1* | 10/2016 | Watarai | ............... | H05B 47/105 |
| 2018/0178879 A1* | 6/2018 | Mioka | ............... | G01L 1/2262 |
| 2018/0178883 A1* | 6/2018 | Ichida | ............... | B62J 99/00 |
| 2019/0248438 A1* | 8/2019 | Masuda | ............... | B62J 99/00 |
| 2020/0255087 A1* | 8/2020 | Menichetti | ............... | B62M 6/45 |

FOREIGN PATENT DOCUMENTS

| | | |
|---|---|---|
| DE | 10 2016 112 772 A1 | 2/2017 |
| JP | 2002-154414 A | 5/2002 |
| JP | 2017-30395 A | 2/2017 |

\* cited by examiner

BICYCLE SYSTEM

CROSS-REFERENCE TO RELATED APPLICATIONS

This application claims priority to Japanese Patent Application No. 2017-205537, filed on Oct. 24, 2017. The entire disclosure of Japanese Patent Application No. 2017-205537 is hereby incorporated herein by reference.

BACKGROUND

Field of the Invention

The present invention generally relates to a brake system.

Background Information

Japanese Laid-Open Patent Publication No. 2017-30395 (Patent document 1) discloses an example of a brake system applied to a human-powered vehicle. The brake system includes a driving part driven by electric power to brake a rotary body of the human-powered vehicle and a controller configured to control the driving part.

SUMMARY

In a human-powered vehicle, it is preferred that power consumption of the driving part be reduced in the brake system.

A brake system in accordance with a first aspect of the present disclosure includes a driving part driven by electric power to brake a rotary body of a human-powered vehicle and an electronic controller configured to control the driving part. The electronic controller has a plurality of control modes including a first mode that drives the driving part in accordance with a user operation and a second mode that does not drive the driving part regardless of the user operation. The electronic controller is configured to switch the plurality of control modes based on setting information related to an input to the human-powered vehicle. In a case in which the second mode is selected based on the setting information, the driving part is not driven. This reduces power consumption of the driving part.

A brake system in accordance with a second aspect of the present disclosure includes a driving part driven by electric power to brake a rotary body of a human-powered vehicle and an electronic controller configured to control the driving part. The electronic controller has a plurality of control modes including a first mode that drives the driving part in accordance with a user operation and a second mode that maintains the driving part in a standby state regardless of the user operation. The electronic controller is configured to switch the plurality of control modes based on setting information related to an input to the human-powered vehicle. In a case in which the second mode is selected based on the setting information, the driving part is maintained in the standby state. This reduces power consumption of the driving part.

A brake system in accordance with a third aspect of the present disclosure includes a driving part driven by electric power to brake a rotary body of a human-powered vehicle and an electronic controller configured to control the driving part. The electronic controller has a plurality of control modes including a first mode and a second mode that controls the driving part so that power consumption is less than the first mode. The electronic controller is configured to switch the plurality of control modes based on setting information related to an input to the human-powered vehicle. In a case in which the second mode is selected based on the setting information, power consumption of the driving part is reduced from a case in which the first mode is selected.

In accordance with a fourth aspect of the present disclosure, the brake system according to any one of the first to third aspects is configured so that the setting information includes first information related to vibration of the human-powered vehicle. This allows the plurality of control modes to be switched in a preferred manner by acknowledging a non-driven state (still state) of the human-powered vehicle from vibration of the human-powered vehicle.

In accordance with a fifth aspect of the present disclosure, the brake system according to the fourth aspect is configured so that upon the electronic controller determining a still state of the human-powered vehicle exceeds a predetermined time in the first mode, the electronic controller is configured to switch from the first mode to the second mode. Thus, power consumption of the driving part is reduced if the human-powered vehicle is in the non-driven state.

In accordance with a sixth aspect of the present disclosure, the brake system according to the fourth or fifth aspect is configured so that upon the electronic controller determining the human-powered vehicle vibrates in the second mode, the electronic controller is configured to switch from the second mode to the first mode. This allows the electronic controller to easily switch the control mode from the second mode to the first mode as a non-driven state shifts to a driven state.

In accordance with a seventh aspect of the present disclosure, the brake system according to any one of the first to sixth aspects is configured so that the setting information includes second information related to rotation of the rotary body. This allows the plurality of control modes to be switched in a preferred manner by acknowledging a non-driven state (still state) of the human-powered vehicle from rotation of the rotary body.

In accordance with an eighth aspect of the present disclosure, the brake system according to the seventh aspect is configured so that upon the electronic controller determining a non-rotated state of the rotary body exceeds a predetermined time in the first mode, the electronic controller is configured to switch from the first mode to the second mode. Thus, power consumption of the driving part is reduced if the human-powered vehicle is in the non-driven state.

In accordance with a ninth aspect of the present disclosure, the brake system according to the seventh or eighth aspect is configured so that upon the electronic controller determining the rotary body rotates in the second mode, the electronic controller is configured to switch from the second mode to the first mode. This allows the electronic controller to easily switch the control mode from the second mode to the first mode as a non-driven state shifts to a driven state.

In accordance with a tenth aspect of the present disclosure, the brake system according to any one of the first to ninth aspects is configured so that the setting information includes third information related to rotation of a crank to which human driving force is input. This allows the plurality of control modes to be switched in a preferred manner by acknowledging a non-driven state (still state) of the human-powered vehicle from rotation of the crank.

In accordance with an eleventh aspect of the present disclosure, the brake system according to the tenth aspect is configured so that upon the electronic controller determining a non-rotated state of the crank exceeds a predetermined time in the first mode, the electronic controller is configured to switch from the first mode to the second mode. Thus, power consumption of the driving part is reduced if the human-powered vehicle is in the non-driven state.

In accordance with a twelfth aspect of the present disclosure, the brake system according to the tenth or eleventh aspect is configured so that upon the electronic controller determining the crank rotates in the second mode, the electronic controller is configured to switch from the second mode to the first mode. This allows the electronic controller to easily switch the control mode from the second mode to the first mode as a non-driven state shifts to a driven state.

In accordance with a thirteenth aspect of the present disclosure, the brake system according to any one of the first to twelfth aspects is configured so that the setting information includes fourth information related to riding of the human-powered vehicle by a user. This allows the plurality of control modes to be switched in a preferred manner based on whether or not the user is riding the human-powered vehicle.

In accordance with a fourteenth aspect of the present disclosure, the brake system according to the thirteenth aspect is configured so that the fourth information includes information related to total weight of the human-powered vehicle including weight of the user. This allows for easy determination of whether or not the user is riding the human-powered vehicle based on the total weight of the human-powered vehicle.

In accordance with a fifteenth aspect of the present disclosure, the braking system according to the fourteenth aspect is configured so that upon the electronic controller determining the total weight decreases in the first mode, the electronic controller is configured to switch from the first mode to the second mode. Thus, power consumption of the driving part is reduced if the human-powered vehicle is in the non-driven state.

In accordance with a sixteenth aspect of the present disclosure, the braking system according to the fourteenth or fifteenth aspect is configured so that upon the electronic controller determining the total weight increases in the second mode, the electronic controller is configured to switch from the second mode to the first mode. This allows the electronic controller to easily switch the control mode from the second mode to the first mode as a non-riding state shifts to a riding state.

In accordance with a seventeenth aspect of the present disclosure, the braking system according to any one of the first to sixteenth aspects is configured so that the setting information includes fifth information related to an operated state of an operation unit that is manually operated to drive the driving part. This allows the plurality of control modes to be switched in a preferred manner by acknowledging whether or not the user is riding the human-powered vehicle based on operation of the operation unit.

In accordance with an eighteenth aspect of the present disclosure, the braking system according to the seventeenth aspect is configured so that upon the electronic controller determining a non-operated state during which the operation unit is not operated exceeds a predetermined time in the first mode, the electronic controller is configured to switch from the first mode to the second mode. Thus, power consumption of the driving part is reduced if the human-powered vehicle is in a non-riding state.

In accordance with a nineteenth aspect of the present disclosure, the brake system according to the seventeenth or eighteenth aspect is configured so that upon the electronic controller determining the operation unit is operated in the second mode, the electronic controller is configured to switch from the second mode to the first mode. This allows the electronic controller to easily switch the control mode from the second mode to the first mode as a non-riding state shifts to a riding state.

In accordance with a twentieth aspect of the present disclosure, the brake system according to any one of the first to nineteenth aspects is configured so that the setting information includes sixth information related to a locking device of the human-powered vehicle. This allows the plurality of control modes to be switched in a preferred manner by acknowledging a non-driven state (still state) of the human-powered vehicle from a locking state of the human-powered vehicle.

In accordance with a twenty-first aspect of the present disclosure, the brake system according to the twentieth aspect is configured so that upon the electronic controller determining the locking device shifts to a lock state in the first mode, the electronic controller is configured to switch from the first mode to the second mode. Thus, power consumption of the driving part is reduced if the human-powered vehicle is in a non-driven state.

In accordance with a twenty-second aspect of the present disclosure, the brake system according to the twentieth or twenty-first aspect is configured so that upon the electronic controller determining the locking device shifts to an unlock state in the second mode, the electronic controller is configured to switch from the second mode to the first mode. This allows the electronic controller to easily switch the control mode from the second mode to the first mode as a non-riding state shifts to a riding state.

In accordance with a twenty-third aspect of the present disclosure, the brake system according to any one of the first to twenty-second aspects is configured so that the setting information includes seventh information related to activation and deactivation of a switch connected to the brake system. This allows the plurality of control modes to be switched in a preferred manner based on an input of the user.

In accordance with a twenty-fourth aspect of the present disclosure, the brake system according to the twenty-third aspect is configured so that upon the electronic controller determining the switch is deactivated in the first mode, the electronic controller is configured to switch from the first mode to the second mode. Thus, power consumption of the driving part is reduced if the switch is deactivated.

In accordance with a twenty-fifth aspect of the present disclosure, the brake system according to the twenty-third or twenty-fourth aspect is configured so that upon the electronic controller determining the switch is activated in the second mode, the electronic controller is configured to switch from the second mode to the first mode. This allows the electronic controller to easily switch the control mode from the second mode to the first mode.

The brake system in accordance with the present disclosure reduces power consumption of the driving part.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

A human-powered vehicle A that includes a brake system 10 will now be described with reference to FIG. 1. The human-powered vehicle A includes the brake system 10. Human-powered vehicles refer to vehicles that at least partially use human power as a driving force for propulsion and include vehicles that assist human power with electric motors. Human-powered vehicles do not include vehicles using driving forces other than human power. In particular, human-powered vehicles do not include vehicles that solely use internal combustion engines for driving force. A typical human-powered vehicle is a small and light vehicle that does not required a license for driving on a public road. The illustrated human-powered vehicle A is a bicycle (e-bike) including an assist device C that uses electric energy to assist propulsion of the human-powered vehicle A. More specifically, the illustrated human-powered vehicle A is a city bicycle. The configuration of the human-powered vehicle A can be changed in any manner. The human-powered vehicle A can be configured without the assist device C. In other words, the human-powered vehicle A can be a typical bicycle that is driven by only human driving force. The type of the human-powered vehicle A can be a road bike, a mountain bike, or a cross bike. The human-powered vehicle A includes a main body A1, a handlebar A2, a front wheel A3, a rear wheel A4, a drive mechanism B, the assist device C, a battery D and a brake system 10. The main body A1 includes a frame A7.

The drive mechanism B transfers a human driving force to the rear wheel A4. The drive mechanism B is a chain-drive type that includes a front sprocket B1, a rear sprocket B2, a chain B3, a crank mechanism E and a pair of pedals B4. The drive mechanism B can be of any type such as a belt-drive type or a shaft-drive type.

The crank mechanism E includes a crankshaft E1, a right crank E2, and a left crank E3. The crankshaft E1 is rotatably supported by a bottom bracket provided on the frame A7. The right crank E2 and the left crank E3 are each coupled to the crankshaft E1. One of the pedals B4 is rotatably supported by the right crank E2. The other one of the pedals B4 is rotatably supported by the left crank E3.

The front sprocket B1 is coupled to the crankshaft E1. The crankshaft E1 and the front sprocket B1 are coaxial. Any structure can be used to couple the crankshaft E1 and the front sprocket B1. A one-way clutch is provided between the crankshaft E1 and the front sprocket B1. The one-way clutch transfers rotation of the crankshaft E1 to the front sprocket B1 in a case in which the rotational speed of the crankshaft E1, which is rotated forward, is faster than the rotational speed of the front sprocket B1. The front sprocket B1 and the crankshaft E1 can be coupled so as to be relatively non-rotatable.

The rear sprocket B2 is rotatably supported by the rear wheel A4. The chain B3 is wound around the front sprocket B1 and the rear sprocket B2. In a case in which the human driving force applied to the pedals B4 rotates the crankshaft E1 and the front sprocket B1 forward, the human driving force transferred by the chain B3 and the rear sprocket B2 rotates the rear wheel A4 forward.

The assist device C includes an assist motor C1, a drive circuit C2, a reduction gear C3 and a one-way clutch (not shown). The assist device C transfers torque to the front sprocket B1 to assist propulsion of the human-powered vehicle A. The battery D supplies electric power to the assist motor C1. The battery D is provided on the frame A7.

Figure 2:
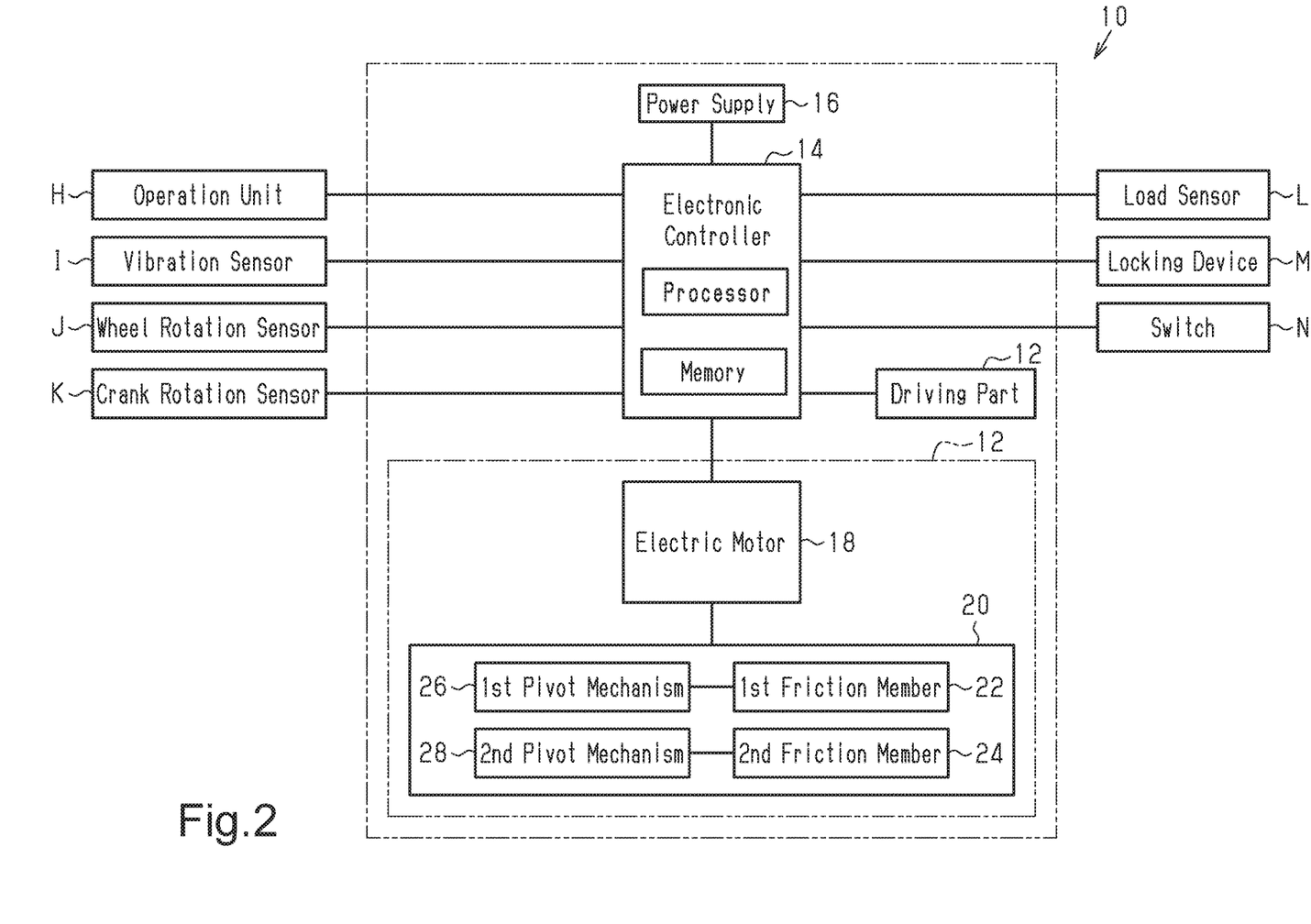
FIG. 2 is a block diagram of the brake system shown in FIG. 1.

As shown in FIG. 2, the human-powered vehicle A (bicycle A) further includes an operation unit H, a vibration sensor I, a wheel rotation sensor J, a crank rotation sensor K, a load sensor L, a locking device M and a switch N.

The operation unit H is manually operated to drive driving parts 12 of the brake system 10. The operation unit H is, for example, an operation device including a lever. The operation unit H is communicably connected to the brake system 10 to send a signal that is in correspondence with the operation of the lever to the brake system 10. The operation unit H is communicably connected to the brake system 10 by a communication wire or an electric wire allowing for Power Line Communication (PLC). The operation unit H can be communicably connected to the brake system 10 by a wireless communication device that allows for wireless communication. Operation of the operation unit H sends a signal via the wireless communication device to an electronic controller 14 of the brake system 10 for braking at least one of the front wheel A3 and the rear wheel A4. The term "electronic controller" as used herein refers to hardware that executes a software program. The electronic controller 14 will hereafter be referred to simply as the controller 14. The driving parts 12 are actuated in accordance with the signal.

The vibration sensor I detects vibration that is generated in the human-powered vehicle A. One example of a vibration detected by the vibration sensor I is a vibration level (dB) that indicates a magnitude of vibration. The vibration sensor I is provided on, for example, the frame A7 of the human-powered vehicle A. The vibration sensor I is, for example, an acceleration sensor, a speed sensor, or a displacement sensor. The vibration sensor I is communicably connected by wired-communication or wireless communication to the controller 14. The controller 14 calculates the vibration magnitude or level of the human-powered vehicle A based on the output of the vibration sensor I. Preferably, the controller 14 calculates the magnitude of at least one of a vertical vibration in the up-down direction (vertical direction) of the human-powered vehicle A and a lateral (sideward) vibration in the left-right direction (sideward direction) of the human-powered vehicle A.

The wheel rotation sensor J (rotor rotation sensor) detects rotation (rotational speed) of at least one of the front wheel A3 and the rear wheel A4 of the human-powered vehicle A. The wheel rotation sensor J is communicably connected by wired communication or wireless communication to the controller 14. In this embodiment, a front fork A8 of the frame A7 and a seatstay of the frame A7 are each provided with the wheel rotation sensor J. The wheel rotation sensors J are communicably connected by wired communication or wireless communication to the controller 14. One of the wheel rotation sensors J outputs a signal that is in correspondence with a change in the relative position of the wheel rotation sensor J and a magnet attached to the front wheel A3 to the controller 14 of the brake system 10. The controller 14 calculates the velocity or speed of the human-powered vehicle A based on the signal. This allows for detection of whether or not rotary bodies F are rotating. Another one of the wheel rotation sensors J outputs a signal that is in correspondence with a change in the relative position of the wheel rotation sensor J and a magnet attached to the rear wheel A4 to the controller 14 of the brake system 10. Based on the relative rotational speed of the front wheel A3 and the rear wheel A4, the controller 14 controls electric motors 18 (described later) of the driving parts 12 to adjust the braking force applied to the rotary bodies F of the human-powered vehicle A. More specifically, in a case in which the rotational speed of one of the front wheel A3 and the rear wheel A4 is lower by a predetermined value or greater than the rotational speed of the other one of the front wheel A3 and the rear wheel A4, the controller 14 controls the front and rear driving parts 12 to temporarily (intermittently) cancel braking of one of the front wheel A3 and the rear wheel A4. That is, the controller 14 is configured to execute Antilock Brake System (ABS) control on the front and rear driving parts 12. In this embodiment, the rotary bodies F are disc brake rotors (hereafter referred to as "the rotors") provided on the front wheel A3 and the rear wheel A4 of the human-powered vehicle A. The wheel rotation sensors J can be provided on the driving parts 12 or the like to detect rotation of the rotors, which are the rotary bodies F.

Figure 1:
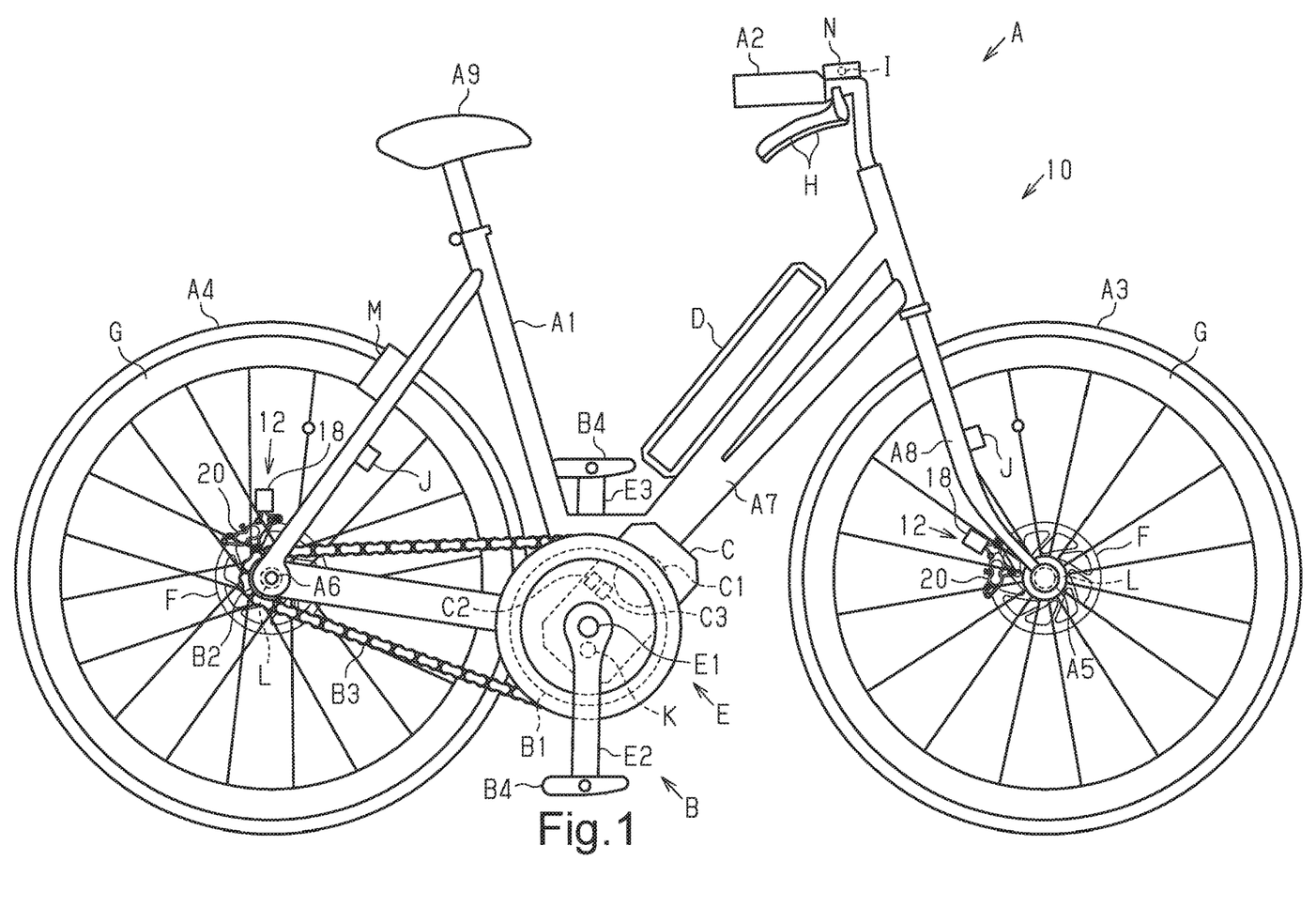
FIG. 1 is a side elevational view of a human-powered vehicle equipped with a brake system in accordance with one embodiment.

The crank rotation sensor K detects the rotational speed and the rotational angle of the crankshaft E1 (refer to FIG. 1). The crank rotation sensor K is mounted on the frame A7 of the human-powered vehicle A. The crank rotation sensor K is configured including a magnetic sensor that outputs a signal corresponding to the magnetic field strength. The crank rotation sensor K is communicably connected by wired communication or wireless communication to the controller 14. The crank rotation sensor K outputs a signal that is in correspondence with the rotational speed or the rotational angle of the crankshaft E1 to the controller 14.

The load sensor L detects a total weight of the human-powered vehicle A including the weight of the user. The total weight of the human-powered vehicle A includes the weight of the human-powered vehicle A and the weight of the user riding the human-powered vehicle A. The load sensor L detects the load on the front wheel A3 or the rear wheel A4. The load sensor L is provided on, for example, an axle A5 of the front wheel A3 or an axle A6 of the rear wheel A4. The load sensor L is, for example, a load cell. The load sensor L is communicably connected by wired communication or wireless communication to the controller 14. The load sensor L outputs a signal that is in correspondence with the pressure applied to the load sensor L from the front wheel A3 or the rear wheel A4 to the controller 14. The load sensor L can be used to detect loads on the handlebar A2, the pedals B4, and a saddle A9 of the human-powered vehicle A. In this case, the sum of the weight of the human-powered vehicle A specified in advance and loads of the handlebar A, the pedals B4, and the saddle A2 detected by load sensors may be used as fourth information, which will be described later.

The locking device M locks and unlocks the rear wheel A4. In other words, the lock device M is configured to be switched to a lock state, which restricts rotation of the rear wheel A4, and an unlock state, which allows rotation of the rear wheel A4. The locking device M is communicably connected by wired communication or wireless communication to the controller 14. The locking device M is mounted on, for example, a seatstay of the frame A7. The locking device M outputs a signal corresponding to the lock state or unlock state of the rear wheel A4 to the controller 14.

The switch N includes a plurality of switches (e.g., buttons) that switch on and off the assist device C and the brake system 10. The switch N is communicably connected to the assist device C and the brake system 10. The switch N can be communicably connected to the assist device C and the brake system 10 by a wireless communication device that allows for wireless communication. The switch N is provided on, for example, the handlebar A2 (refer to FIG. 1).

As shown in FIG. 2, the brake system 10 includes the driving parts 12 and the controller 14. Preferably, the brake system 10 further includes a power supply 16.

The driving parts 12 are driven by electric power to brake the rotary bodies F (refer to FIG. 1) of the human-powered vehicle A. The driving parts 12 are driven by electric power to adjust the braking force applied to the rotary bodies F of the human-powered vehicle A. That is, the driving parts 12 have the functions of an Antilock Brake System (ABS) unit. This embodiment includes two of the driving parts 12, one for the front wheel A3 and one for the rear wheel A4. The operation unit H and the controller 14 can be configured to include two levers corresponding to the front and rear driving parts 12 or can be configured to operate the front and rear driving parts 12 with a single lever. The driving parts 12 include the electric motors 18 and brakes 20. The electric motors 18 are actuated by electric power supplied from the power supply 16. In this embodiment, the brakes 20 are disc brake calipers that brake the rotary bodies F (refer to FIG. 1), which are rotors, of the human-powered vehicle A. The brakes 20 can be rim brake calipers that brake rims G (refer to FIG. 1) of the front wheel A3 and the rear wheel A4 of the human-powered vehicle A.

Each of the brakes 20 includes a first friction member 22, a second friction member 24, a first pivot mechanism 26 and a second pivot mechanism 28. The first friction member 22 and the second friction member 24 are, for example, disc brake pads. The first friction member 22 is faced toward one surface of the corresponding rotary body F. The first friction member 22 is pushed by the first pivot mechanism 26 against the one surface of the rotary body F to brake the rotary body F. The second friction member 24 is faced toward the other surface of the corresponding rotary body F. The second friction member 24 is faced toward the first friction member 22 with the rotary body F located in between. The second friction member 24 is pushed by the second pivot mechanism 28 against the other surface of the rotary body F to brake the rotary body F. The first pivot mechanism 26 moves the first friction member 22 toward and away from the rotary body F. The second pivot mechanism 28 moves the second friction member 24 toward and away from the rotary body F. In this embodiment, the electric motor 18 and the brake 20 are integrated to form the driving part 12 (a brake device). The electric motor 18 directly drives the first pivot mechanism 26 and the second pivot mechanism 28 of the brake 20. If necessary, the electric motor 18 and the brake 20 can be separated, and the brake 20 can be indirectly driven by the electric motor 18. In this case, hydraulic oil or a cable (Bowden cable) is used as a power transfer medium for the electric motor 18. When using hydraulic oil as the power transfer medium, a pump is driven by the electric motor 18. When a cable is used as the power transmission medium, a cable winding mechanism including gears is driven by the electric motors 18.

The power supply 16 supplies power to the brake system 10 and the assist device C. The power supply 16 can have any configuration. For example, the power supply 16 includes a rechargeable battery. If the power supply 16 is a rechargeable battery, the power supply 16 can be provided at any location on the main body A1. In a further example, the power supply 16 is an electrical generator that generates power as the human-powered vehicle A travels. One example of an electrical generator is a dynamo. If the power supply 16 is a dynamo, the power supply 16 is, for example, a hub dynamo provided on the front wheel A3.

The controller 14 is operatively coupled to the driving parts 12 to control the driving parts 12. The controller 14 includes at least one processor, such as a Central Processing Unit (CPU) or a Micro Processing Unit (MPU), and a memory (computer storage device). The electronic controller 12 is formed of one or more semiconductor chips that are mounted on a printed circuit board. The processor(s) and the memory can be provided on the same printed circuit board, or the memory can be a separate part from the processor(s). The memory includes, for example, a random access memory (RAM) and a read only memory (ROM). The memory can include a semiconductor memory and/or a hard disk drive. The memory is any computer storage device or any computer readable medium with the sole exception of a transitory, propagating signal. The controller 14 has a plurality of control modes including a first mode for driving the driving parts 12 in accordance with user operations and a second mode for driving the driving parts 12 regardless of user operations. The second mode is a standby mode (sleep mode) that maintains the driving parts 12 in a standby mode regardless of user operations. In other words, the controller 14 has the plurality of control modes including the first mode that drives the driving parts 12 in accordance with user operations and the second mode that maintains the driving parts 12 in the standby state regardless of user operations. The second mode (standby mode) can be a state in which the driving parts 12 are supplied with low power so that the driving parts 12 can be readily driven if the user operates the operation unit H. Further, the second mode is a low power consumption mode in which the human-powered vehicle A consumes less power than the first mode. In other words, the controller 14 has the plurality of control modes including the first mode and the second mode that controls the driving parts 12 so that power consumption is less than the first mode. The controller 14 switches between the plurality of control modes based on setting information related to inputs to the human-powered vehicle A. The storage stores programs used by the controller 14 to execute the plurality of control modes including the first mode and the second mode. The processor deploys or executes the programs stored in the storage to implement the plurality of control modes including the first mode and the second mode.

The setting information includes first information to seventh information. The first information includes information related to vibration of the human-powered vehicle A. In the first mode, if a still state of the human-powered vehicle A exceeds a predetermined time TA, then the controller 14 switches from the first mode to the second mode. That is, if the controller 14 acknowledges from the vibration of the human-powered vehicle A that the human-powered vehicle A is in a non-driven state (still state), then the controller 14 switches from the first mode to the second mode. Thus, power consumption of the driving parts 12 can be reduced if the human-powered vehicle A is in a non-driven state. The human-powered vehicle A is in a still state (non-driven state) if the vibration sensor I does not detect vibration of the human-powered vehicle A. The predetermined time TA is the time allowing for determination that the human-powered vehicle A is in a non-driven state because vibration of the human-powered vehicle A is not detected. If the human-powered vehicle A vibrates in the second mode, then the controller 14 switches from the second mode to the first mode. Thus, if a non-driven state shifts to a driven state, then the controller 14 can easily switch the control mode from the second mode to the first mode.

The second information includes information related to the rotation of the rotary bodies F. In the first mode, if a non-rotated state of the rotary bodies F exceeds a predetermined time TB, then the controller 14 switches from the first mode to the second mode. That is, if the controller 14 acknowledges from the rotation of the rotary bodies F that the human-powered vehicle A is in a non-driven state (still state), the controller 14 switches from the first mode to the second mode. Thus, power consumption of the driving parts 12 can be reduced if the human-powered vehicle A is in a non-driven state. The human-powered vehicle A is in a still state (non-driven state) if the rotational speed of the rotary bodies F detected by the wheel rotation sensors J is zero. The predetermined time TB is the time allowing for determination that the human-powered vehicle A is still (stopped) because the rotational speed of the rotary bodies F is zero. If the rotary bodies F rotate in the second mode, then the controller 14 switches from the second mode to the first mode. Thus, if a non-driven state shifts to a driven state, then the controller 14 can easily switch the control mode from the second mode to the first mode.

The third information includes information related to rotation of the crankshaft E1 to which human driving force is input. In the first mode, if the stopped state of the crankshaft E1 exceeds a predetermined time TC, then the controller 14 switches from the first mode to the second mode. That is, if the controller 14 acknowledges from the rotation of the crankshaft E1 that the human-powered vehicle A is in a non-driven state (still state), then the controller 14 switches from the first mode to the second mode. Thus, power consumption of the driving parts 12 can be reduced if the human-powered vehicle A is in a non-driven state. The human-powered vehicle A is in a still state (non-driven state) if the rotational speed of the crankshaft E1 detected by the crank rotation sensor K is zero. The predetermined time TC is the time allowing for determination that the user is not riding the human-powered vehicle A because the rotational angle of the crankshaft E1 is zero. If the crankshaft E1 rotates in the second mode, then the controller 14 switches from the second mode to the first mode. Thus, if a non-driven state shifts to a driven state, then the controller 14 can easily switch the control mode from the second mode to the first mode.

The fourth information includes information related to user-riding information of the human-powered vehicle A. This allows for switching in a preferred manner between the plurality of control modes based on whether or not the user is riding the human-powered vehicle A. The fourth information includes information related to the total weight WA of the human-powered vehicle A including the weight of the user. This allows for determination of whether or not the user is riding the human-powered vehicle A based on the information related to the total weight WA of the human-powered vehicle A. If the total weight WA decreases in the first mode, the controller 14 switches from the first mode to the second mode. Thus, power consumption of the driving parts 12 can be reduced if the human-powered vehicle A is in a non-riding state. If the total weight WA increases in the second mode, then the controller 14 switches from the second mode to the first mode. Thus, if a non-riding state shifts to a riding state, then the controller 14 can easily switch the control mode from the second mode to the first mode.

The fifth information includes information related to an operated state of the operation unit H that is manually operated to drive the driving parts 12. Thus, if the controller 14 acknowledges whether or not the user is riding the human-powered vehicle A based on operation of the operation unit H, then the controller 14 can switch between the plurality of control modes in a preferred manner. In the first mode, if a non-operation time during which the operation unit H is not operated exceeds a predetermined time TD, then the controller 14 switches from the first mode to the second mode. In a non-operated state, the operation unit H does not output a signal to the controller 14. The predetermined time TD is the time allowing for determination that the human-powered vehicle A is still (stopped) because the operation unit H is not outputting a signal. Thus, power consumption of the driving parts 12 can be reduced if the human-powered vehicle A is in a non-riding state. If the operation unit H is operated in the second mode, then the controller 14 switches from the second mode to the first mode. Thus, if a non-riding state shifts to a riding state, then the controller 14 can easily switch the control mode from the second mode to the first mode.

The sixth information is information related to the locking device M of the human-powered vehicle A. Thus, if the controller 14 acknowledges that the human-powered vehicle A is in a non-driven state (still state) based on a locking state of the human-powered vehicle A, then the controller 14 can switch between the plurality of control modes. If the locking device M is in a lock state in the first mode, then the controller 14 switches from the first mode to the second mode. Thus, power consumption of the driving parts 12 can be reduced if the human-powered vehicle A is in a non-driven state. If the locking device M shifts to an unlock state in the second mode, then the controller 14 switches from the second mode to the first mode. Thus, if a non-driven state shifts to a driven state, then the controller 14 can easily switch the control mode from the second mode to the first mode.

The seventh information includes information related to activation and deactivation of the switch N connected to the brake system 10. Thus, the controller 14 can switch between the plurality of control modes based on the input of the user. If the switch N is deactivated in the first mode, then the controller 14 switches the first mode to the second mode. Thus, power consumption of the driving parts 12 can be reduced if the switch N is deactivated. If the switch N is activated in the second mode, then the controller 14 switches from the second mode to the first mode. Thus, the controller 14 can easily switch the control mode from the second mode to the first mode.

The controller 14 executes a first control and a second control based on the setting information. The first control is repeatedly executed in a state in which the first mode is selected. The second control is repeatedly executed in a state in which the second mode is selected. The switching between the first mode and the second mode based on any of the first to seventh information included in the setting information can be omitted from the first control and the second control.

Figure 3:
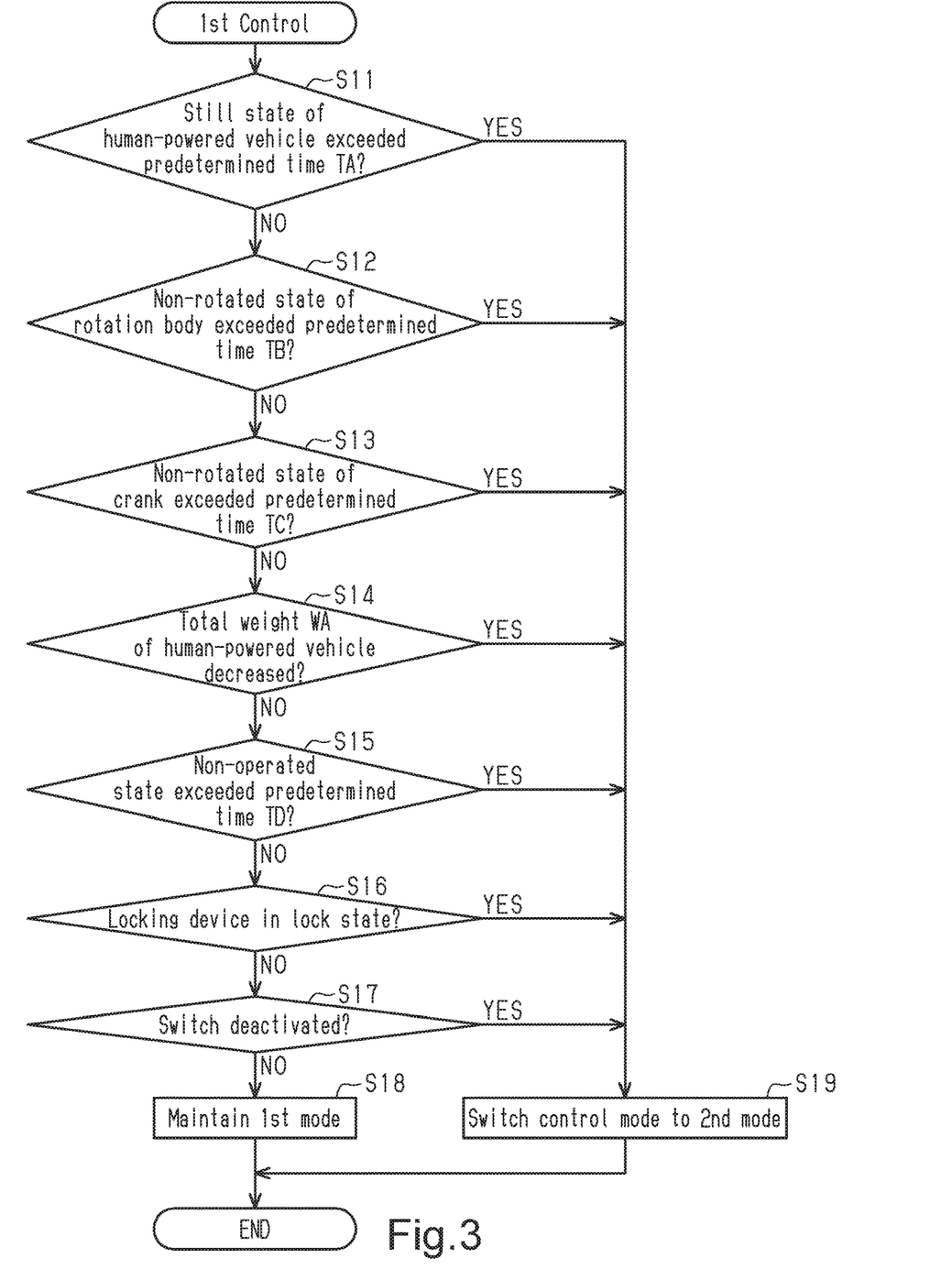
FIG. 3 is a flowchart showing one example of a control process executed in accordance with a first control.

One example of the first control will now be described with reference to FIG. 3.

In step S11, the controller 14 determines from the output of the vibration sensor I whether or not a still state of the human-powered vehicle A has exceeded the predetermined time TA. If a negative determination is given in step S11, then the controller 14 proceeds to step S12 and determines from the output of the wheel rotation sensors J whether or not a non-rotated state of the rotary bodies F has exceeded the predetermined time TB. If a negative determination is given in step S12, then the controller 14 proceeds to step S13 and determines from the output of the crank rotation sensor K whether or not a non-rotated state of the crankshaft E1 has exceeded the predetermined time TC. If a negative determination is given in step S13, then the controller 14 proceeds to step S14 and determines from the output of the load sensor L whether or not the total weight WA of the human-powered vehicle A has decreased. If a negative determination is given in step S14, then the controller 14 proceeds to step S15 and determines from the output of the operation unit H whether or not a non-operated state has exceeded the predetermined time TD. If a negative determination is given in step S15, then the controller 14 proceeds to step S16 and determines from the output of the locking device M whether or not the locking device M is in the lock state. If a negative determination is given in step S16, then the controller 14 proceeds to step S17 and determines from the output of the switch N whether not the switch N is deactivated. If a negative determination is given in step S17, then the controller 14 proceeds to step S18 and maintains the first mode. If an affirmative determination is given in any of steps S11 to S17, then the controller 14 proceeds to step S19 and switches the control mode to the second mode.

Figure 4:
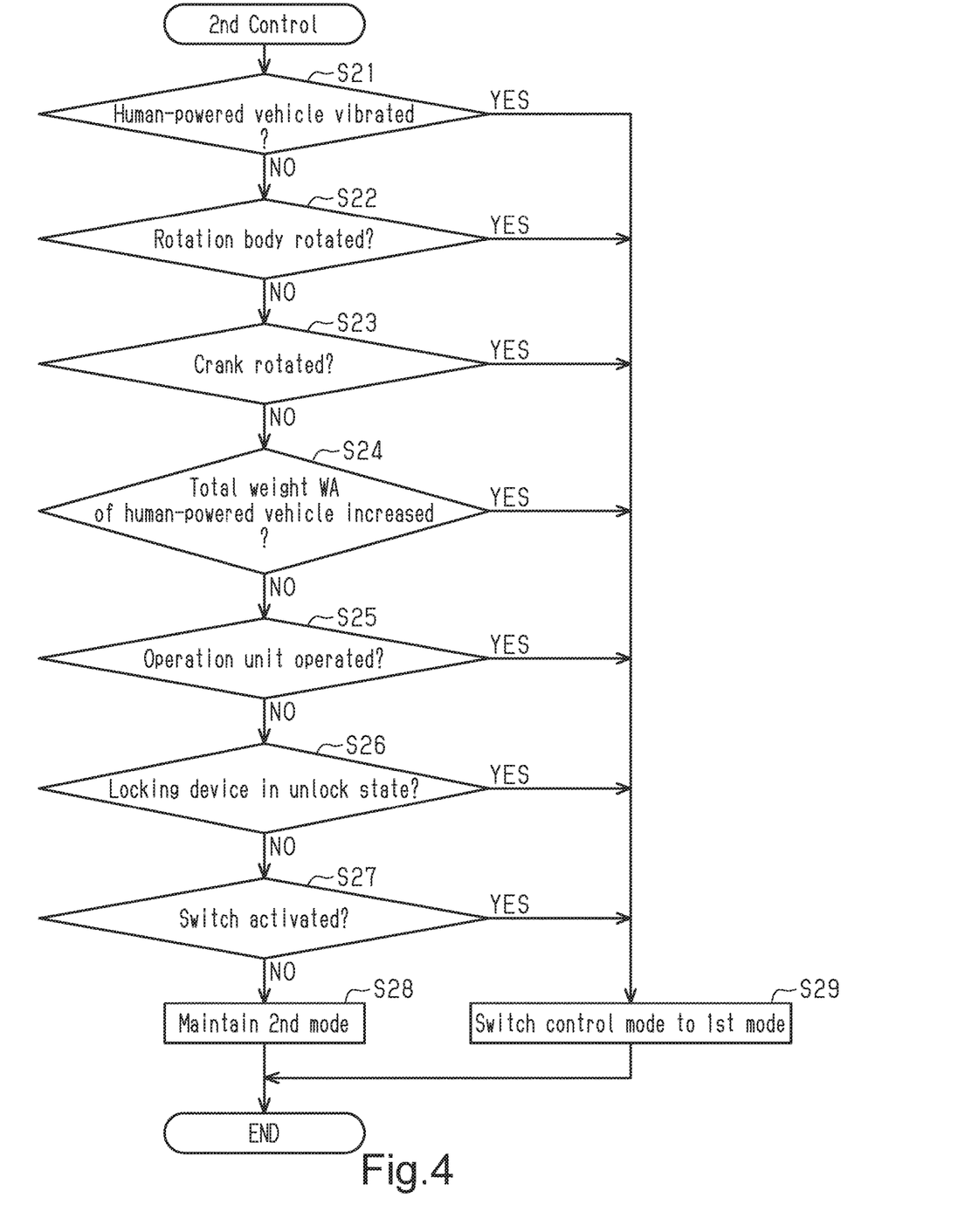
FIG. 4 is a flowchart showing one example of the processing procedures in a second control.

One example of the second control will now be described with reference to FIG. 4.

In step S21, the controller 14 determines from the output of the vibration sensor I whether or not the human-powered vehicle A has vibrated. If a negative determination is given in step S21, then the controller 14 proceeds to step S22 and determines from the output of the wheel rotation sensors J whether or not the rotary bodies F are rotating. If a negative determination is given in step S22, then the controller 14 proceeds to step S23 and determines from the output of the crank rotation sensor K whether or not the crankshaft E1 has rotated. If a negative determination is given in step S23, then the controller 14 proceeds to step S24 and determines from the output of the load sensor L whether or not the total weight WA of the human-powered vehicle A has increased. If a negative determination is given in step S24, then the controller 14 proceeds to step S25 and determines from the output of the operation unit H whether or not the operation unit H has been operated. If a negative determination is given in step S25, then the controller 14 proceeds to step S26 and determines from the output of the locking device M whether or not the locking device M is in an unlock state. If a negative determination is given in step S26, then the controller 14 proceeds to step S27 and determines from the output of the switch N whether or not the switch N has been operated. If a negative determination is given in step S27, then the controller 14 proceeds to step S28 and maintains the second mode. If an affirmative determination is given in any of steps S21 to S27, then the controller 14 proceeds to step S29 and switches the control mode to the first mode.

The brake system 10 is advantageous in that in case the second mode is selected based on the setting information, the driving parts 12 are not driven. This reduces power consumption.

Modifications

The description related with the above embodiment exemplifies an applicable form of a brake system according to the present disclosure and is not intended to limit the form. The brake system according to the present disclosure is applicable to a form that differs from the form exemplified in the above embodiment. Such an example is a form from which part of the structure in the above embodiment is replaced, changed, or omitted. A new element may also be added. Modifications of the above embodiment will now be described.

The configuration of the controller 14 can be changed in any manner. The controller 14 of a modification includes a first controller that controls one of the driving parts 12 and a second controller that controls the other driving part 12. The first controller switches the corresponding driving part 12 between the plurality of control modes based on the setting information. The second controller switches the corresponding driving part 12 between the plurality of control modes based on the setting information. The first controller and the second controller are connected in a communicable manner by wired-communication or wireless communication. One of the two driving parts 12 can be omitted from the brake system 10. The brakes 20 of the two driving parts 12 can each be driven by a single electric motor 18.

In the above embodiment, the brake system in accordance with the present disclosure is exemplified in a case applied to the human-powered vehicle A, which is a bicycle. However, the brake system in accordance with the present disclosure is not limited to a bicycle and applicable to any human-powered vehicle.

What is claimed is:
1. A brake system comprising:
a driving part driven by electric power to brake a rotary body of a human-powered vehicle; and
an electronic controller configured to control the driving part,
the electronic controller having a plurality of control modes including a first mode that drives the driving part in accordance with a user operation and a second mode that does not drive the driving part regardless of the user operation, and the electronic controller being configured to switch the plurality of control modes based on setting information related to an input to the human-powered vehicle.
2. A brake system comprising:
a driving part driven by electric power to brake a rotary body of a human-powered vehicle; and
an electronic controller configured to control the driving part,
the electronic controller having a plurality of control modes including a first mode that drives the driving part in accordance with a user operation and a second mode that maintains the driving part in a standby state regardless of the user operation, and the electronic controller being configured to switch the plurality of control modes based on setting information related to an input to the human-powered vehicle.
3. A brake system comprising:
a driving part driven by electric power to brake a rotary body of a human-powered vehicle; and
an electronic controller configured to control the driving part,
the electronic controller having a plurality of control modes including a first mode and a second mode that controls the driving part so that power consumption is less than the first mode, and the electronic controller being configured to switch the plurality of control modes based on setting information related to an input to the human-powered vehicle.
4. The brake system according to claim 1, wherein
the setting information includes first information related to vibration of the human-powered vehicle.
5. The brake system according to claim 4, wherein
upon the electronic controller determining a still state of the human-powered vehicle exceeds a predetermined time in the first mode, the electronic controller is configured to switch from the first mode to the second mode.
6. The brake system according to claim 4, wherein
upon the electronic controller determining the human-powered vehicle vibrates in the second mode, the electronic controller is configured to switch from the second mode to the first mode.
7. The brake system according to claim 1, wherein
the setting information includes second information related to rotation of the rotary body.
8. The brake system according to claim 7, wherein
upon the electronic controller determining a non-rotated state of the rotary body exceeds a predetermined time in the first mode, the electronic controller is configured to switch from the first mode to the second mode.
9. The brake system according to claim 7, wherein
upon the electronic controller determining the rotary body rotates in the second mode, the electronic controller is configured to switch from the second mode to the first mode.
10. The brake system according to claim 1, wherein
the setting information includes third information related to rotation of a crank to which human driving force is input.
11. The brake system according to claim 10, wherein
upon the electronic controller determining a non-rotated state of the crank exceeds a predetermined time in the first mode, the electronic controller is configured to switch from the first mode to the second mode.
12. The brake system according to claim 10, wherein
upon the electronic controller determining the crank rotates in the second mode, the electronic controller is configured to switch from the second mode to the first mode.
13. The brake system according to claim 1, wherein
the setting information includes fourth information related to riding of the human-powered vehicle by a user.
14. The brake system according to claim 13, wherein
the fourth information includes information related to total weight of the human-powered vehicle including weight of the user.
15. The braking system according to claim 14, wherein
upon the electronic controller determining the total weight decreases in the first mode, the electronic controller is configured to switch from the first mode to the second mode.
16. The braking system according to claim 14, wherein
upon the electronic controller determining the total weight increases in the second mode, the electronic controller is configured to switch from the second mode to the first mode.
17. The braking system according to claim 1, wherein
the setting information includes fifth information related to an operated state of an operation unit that is manually operated to drive the driving part.
18. The braking system according to claim 17, wherein
upon the electronic controller determining a non-operated state during which the operation unit is not operated exceeds a predetermined time in the first mode, the electronic controller is configured to switch from the first mode to the second mode.

19. The brake system according to claim 17, wherein upon the electronic controller determining the operation unit is operated in the second mode, the electronic controller is configured to switch from the second mode to the first mode.

20. The brake system according claim 1, wherein the setting information includes sixth information related to a locking device of the human-powered vehicle.

21. The brake system according to claim 20, wherein upon the electronic controller determining the locking device shifts to a lock state in the first mode, the electronic controller is configured to switch from the first mode to the second mode.

22. The brake system according to claim 20, wherein upon the electronic controller determining the locking device shifts to an unlock state in the second mode, the electronic controller is configured to switch from the second mode to the first mode.

23. The brake system according to claim 1, wherein the setting information includes seventh information related to activation and deactivation of a switch connected to the brake system.

24. The brake system according to claim 23, wherein upon the electronic controller determining the switch is deactivated in the first mode, the electronic controller is configured to switch from the first mode to the second mode.

25. The brake system according to claim 23, wherein upon the electronic controller determining the switch is activated in the second mode, the electronic controller is configured to switch from the second mode to the first mode.

* * * * *